Nov. 25, 1969   E. W. WILCOX ET AL   3,480,307
LOCK MEANS FOR FIXING RETAINING BOLTS ON ROTATING SHAFTS
Filed Feb. 24, 1969
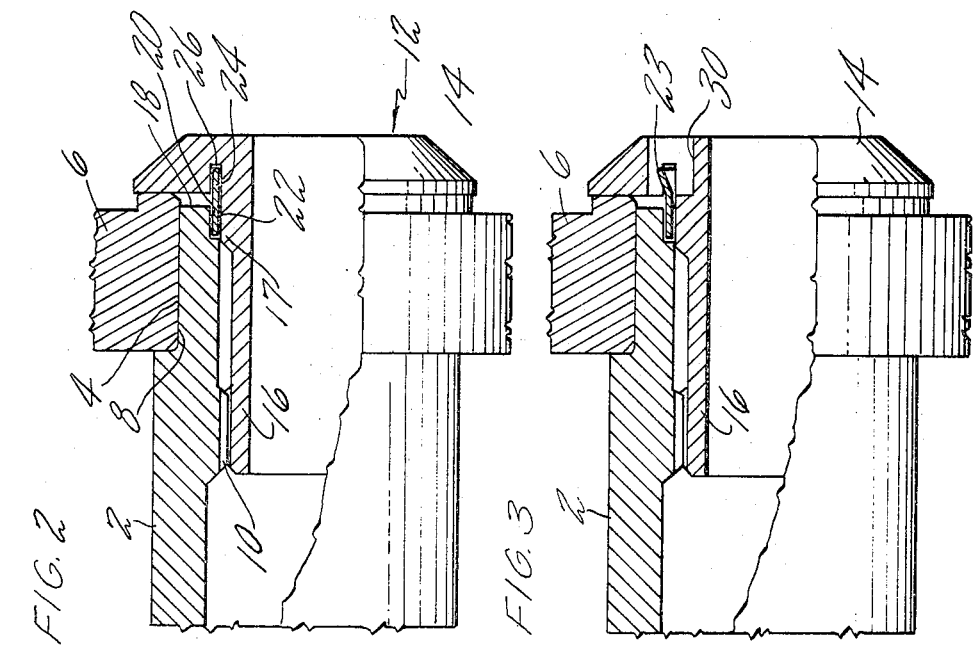
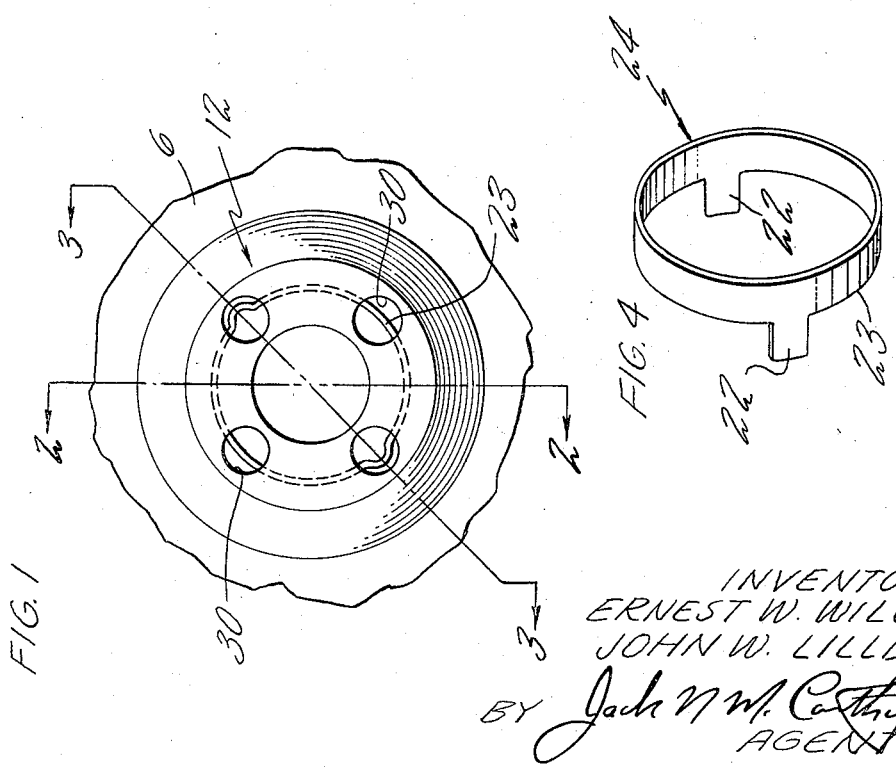
INVENTORS
ERNEST W. WILCOX
JOHN W. LILLBERG
BY Jack N. M. Carthy
AGENT

United States Patent Office 3,480,307
Patented Nov. 25, 1969

3,480,307
LOCK MEANS FOR FIXING RETAINING BOLTS ON ROTATING SHAFTS
Ernest W. Wilcox, Lake Park, and John W. Lillberg, Jupiter, Fla., assignors to United Aircraft Corporation, East Hartford, Conn., a corporation of Delaware
Filed Feb. 24, 1969, Ser. No. 801,679
Int. Cl. F16d 1/06; F16c 3/10
U.S. Cl. 287—53        7 Claims

ABSTRACT OF THE DISCLOSURE

A shaft adapted to rotate has means for retaining a member on a free end which includes a retaining bolt and a lock ring. The free end of the shaft is hollow and is threaded therein to receive threads on the retaining bolt. The part retained extends past the free end of the shaft and engages the inner side of the bolt head. When the retaining bolt is torqued in position the lock ring is contained in an area between the shaft, retaining bolt, and retained part. Tangs fix the lock ring and the shaft against relative rotation and a bent portion of the lock ring extending into an opening in the head of the retaining bolt fixes the lock ring and retaining bolt against relative rotation.

Background of the invention

In some constructions used in the past the lock ring has been placed under compression and has tended to crack and break into smaller pieces. In some cases these pieces have passed on to other parts of a mechanism to impair its operation. This is very undesirable in an aircraft engine where reliability is essential and high speed shafts are encountered.

Summary of the invention

A primary objective of this invention is to provide a lock-ring construction whereby the high torque which helps maintain a retained part is not felt on the lock ring. This eliminates the possibility of yielding the locking tangs.

In accordance with the present invention, the lock ring is completely contained and can sustain a crack and maintain its locking ability during operational conditions.

The invention provides a controlled staking cavity to reduce the possibility of cracking the lock ring during the staking, or bending, operation.

Further, the lock ring does not have a washer part compressed between the retaining bolt and retained part as is the case in some prior art constructions. This, of course, eliminates the problem of a soft washer relaxing and reducing the load applied to the retaining bolt.

Brief description of the drawings

FIGURE 1 is an end view showing a retaining bolt and retained part.
FIGURE 2 is a view taken along the line 2—2, partially in elevation.
FIGURE 3 is a view taken along the line 3—3, partially in elevation.
FIGURE 4 is a perspective view of a lock ring.

Description of the preferred embodiment

Referring to FIGURE 2, a shaft 2 has a free end extending with a section 4 at the end thereof having a reduced diameter. A member 6 to be retained on said shaft is positioned with an opening 8 therein slidably engaging the surface of section 4 of shaft 8. The retained member could for example be the inner ring of a bearing unit. The width of the member 6 adjacent the shaft is greater than the length of the section 4 having a reduced diameter so that it extends over the free end of the shaft 2. The shaft is hollow at its free end and is threaded therein at 10 to receive the threads of a retaining bolt 12.

The retaining bolt 12 is formed having a head 14 and a projection 16 extending therefrom. The free end of the projection 16 is threaded to engage the internal threads of the shaft 2 and the outer portion of the under side of the head engages the member 6 where it extends over the end of the shaft.

The annular end face 18 of the shaft has two diametrically opposed arcuate recesses 20 extending outwardly from the hollow center which receive tangs 22 of a lock ring 24. The tangs 22 project axially from a ring 23 at diametrically opposed locations.

The part 17 of the projection 16 adjacent the head 14 is formed having a diameter slightly less than that of the hollow part of the shaft, and it extends for a length from the head towards the threads so that when the retaining bolt 12 is in a properly torqued position, the part 17 will extend into the hollow shaft at least to cover the sides of the recesses 20. An annular groove 26 is formed in the head 14 on the under side adjacent to the part 17 of the projection 16. The inner side of the annular groove 26 is a continuation of the surface of part 17 of the projection 16 at that point and the outer side of the annular groove 26 extends approximately in line with the outer limit of the recesses 20.

The width of the annular groove 26 and the distance between the outer arcuate ends of the recesses 20 and the surface of the part 17 of the projection 16 is governed by the thickness of the ring 23 of the lock ring 24 and by the thickness of the tangs 22, respectively. The distance in either case is made wider than the cooperating part of the lock ring 24 so that there is a loose fit permitting ease of assembly with no frictional contact between the parts of the lock ring 24 and cooperating parts of the shaft 2 and retaining bolt 12 so as to cause any undue stress on the lock ring 24.

Each tang 22 is made shorter in length than the axial length of its cooperating recess 20 and shorter in width than the width of its cooperating recess. The ring 23 is made shorter in width than the distance between the face 18 and the annular end, or bottom, of the groove 26 in their proper torqued positions. Now, with the retaining bolt in place as shown in FIGURE 2, the lock ring 24 is not compressed axially between the retaining bolt 12 and the shaft 2 or stressed in any other way.

Four holes 30 are equally spaced about the top surface of the bolt head 14. They each extend to a depth which is the thickness of the head. These four holes intersect the annular groove 26 and the groove passes through approximately the center of the holes.

In assembly the retaining bolt is placed under the proper torque with respect to the shaft 2 and retained member 6, and the ring 23 is bent to project into one or more of the recesses formed on the side of the ring 23 by the openings 30. In practice a tool can be placed in one of the openings 30 between the lock ring 24 and the inner side of the opening and operated to bend the ring 23 outwardly into the curvature of the opening (see FIGS. 1 and 3). The openings are sized to control the amount of bending of the lock ring to maintain it within the elastic limit of the material being used to avoid over stretching. For example, knowing the material of the ring the amount of stretch which it can be subjected to without cracking can be figured out. Each hole 30 is then made so that the radius is of a size which would not permit the material to be excessively stretched even if it were bent to touch the side of the hole. This action fixes the retaining bolt against rotation relative to the ring, and as described above, the tangs 22 fix the ring 24 against rotation relative to the shaft.

It can be seen that the lock ring 24 is positioned in a contained space formed by the shaft 2, the retaining bolt 12 and the retained part, or member, 6. While the openings 30 provide some escape, the main concern is centrifugal force. This is especially true in high speed applications.

What is claimed is:

1. In combination, a shaft having a free end, an outwardly extending stop means spaced inwardly from the free end of said shaft, a retained member having an opening which is slidably positioned on the free end of said shaft with one side against the stop means, a retaining bolt having a head and projection therefrom, the free end of said shaft being hollow, the projection of said retaining bolt being positioned in said hollow part of the shaft, the inner side of said head extending radially outwardly from the free end of said shaft, means pulling the head towards the shaft by said projection, recess means located in the free end of said shaft, an annular groove located in the inner side of said head facing said recess means, said head having a hole therein extending from the outer side and intersecting the annular groove, a lock ring, said lock ring having an annular part with tang means extending therefrom, said ring being located with the tang means projecting into said recess means to prevent relative rotation between the shaft and lock ring, the annular part projecting into said annular groove, said annular part projects into said annular groove a distance so that it extends axially into said hole, said annular part being bent extending radially into the hole a distance to prevent relative rotation between the retaining bolt and lock ring.

2. A combination as set forth in claim 1 wherein said retained member adjacent the opening is greater in width than the length of the end of the shaft from the stop means to the free end so that the retained member extends over the free end, the inner side of said head extending radially outwardly from the free end of said shaft contacts the retained member where it extends over the free end, and the means pulling the head toward the shaft by said projection squeezes the retained member between the stop means and the inner side of said head.

3. A combination as set forth in claim 2 wherein the means pulling the head towards the shaft by said projection includes internal threads in the hollow shaft and engaging external threads on the projection.

4. A combination as set forth in claim 2 wherein the shaft has a section of reduced diameter at its free end, the stop means being formed by the shoulder where the section of reduced diameter starts.

5. A combination as set forth in claim 2 where the tang means of said lock ring extends axially from the annular part.

6. A combination as set forth in claim 2 wherein the hole into which the annular part is bent is formed of a depth at that point so that the annular part cannot be overstretched even if the annular part touches the side of the hole.

7. A combination as set forth in claim 2 wherein the recess means includes a recess which opens into the hollow part of the shaft, the projection of retaining bolt adjacent the head is formed having a diameter slightly less than that of the hollow part of the shaft and it extends for a length from the head so that it covers the open side of the recess.

References Cited

UNITED STATES PATENTS

| 232,926 | 10/1880 | Berkholz | 287—53 XR |
| 1,083,747 | 1/1914 | Kocher. | |
| 2,269,429 | 1/1942 | Brenkert | 287—53 |

FOREIGN PATENTS

| 126,958 | 5/1920 | Great Britain. |

DAVID J. WILLIAMOWSKY, Primary Examiner

A. V. KUNDRAT, Assistant Examiner

U.S. Cl. X.R.

74—548